United States Patent
Kaneko

(10) Patent No.: US 11,301,286 B2
(45) Date of Patent: Apr. 12, 2022

(54) SYSTEM AND METHOD FOR SUPPORTING OPTIMIZATION OF USAGE EFFICIENCY OF RESOURCES

(71) Applicant: Hitachi, Ltd., Tokyo (JP)

(72) Inventor: Satoshi Kaneko, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 16/793,940

(22) Filed: Feb. 18, 2020

(65) Prior Publication Data

US 2021/0081229 A1 Mar. 18, 2021

(30) Foreign Application Priority Data

Sep. 13, 2019 (JP) .............................. JP2019-167514

(51) Int. Cl.
- *G06F 9/54* (2006.01)
- *G06F 9/455* (2018.01)
- *G06F 9/451* (2018.01)

(52) U.S. Cl.
CPC .......... *G06F 9/45558* (2013.01); *G06F 9/451* (2018.02); *G06F 9/542* (2013.01); *G06F 9/546* (2013.01); *G06F 2009/45583* (2013.01); *G06F 2009/45591* (2013.01)

(58) Field of Classification Search
CPC ... G06F 9/45533; G06F 9/5077; H04L 29/06; H04L 29/08072; H04L 41/0213
USPC ...................................... 718/1; 709/223, 224
See application file for complete search history.

(56) References Cited

U.S. PATENT DOCUMENTS

| | | | |
|---|---|---|---|
| 8,769,531 B2* | 7/2014 | Anderson | G06F 9/5077 718/1 |
| 8,903,983 B2* | 12/2014 | Bakman | G06F 11/008 709/224 |
| 8,924,534 B2* | 12/2014 | Suri | G06F 9/4856 709/224 |
| 9,407,521 B1 | 8/2016 | Kulkarni | |
| 2011/0099267 A1 | 4/2011 | Suri et al. | |
| 2014/0019972 A1* | 1/2014 | Yahalom | G06F 9/45545 718/1 |
| 2014/0337837 A1* | 11/2014 | Padala | G06F 9/5072 718/1 |
| 2019/0158362 A1 | 5/2019 | Sebih et al. | |
| 2019/0317873 A1 | 10/2019 | Gopisetti et al. | |
| 2020/0026565 A1 | 1/2020 | Rajendran et al. | |

OTHER PUBLICATIONS

Examination Report for related GB App No. 2002728.0 dated Aug. 14, 2020, 10 pgs.

* cited by examiner

*Primary Examiner* — Andy Ho

(74) *Attorney, Agent, or Firm* — Procopio, Cory, Hargreaves & Savitch LLP

(57) ABSTRACT

An optimization support system that supports optimization of usage efficiency of resources identifies resource consumption and cost of each virtual machine, from management data. The management data includes data representing, for each of a plurality of virtual machines, attributes and cost of the virtual machine, and at least resource consumption out of resource consumption and resource usage rate of each of a plurality of types of calculation resources allocated to the virtual machine. The optimization support system displays a management user interface (UI) that is a UI representing both resource consumption and cost regarding the plurality of virtual machines.

14 Claims, 7 Drawing Sheets

FIG.3

VM configuration table
2420

| VM-ID | VM name | Owner name | Application name | OS name | Memory capacity |
|---|---|---|---|---|---|
| 1 | EC_DB1 | E-commerce | EC_DB_A | Linux | 16 |
| 2 | ERP-web | ERP | ERP_web_A | Windows | 32 |
| 3 | EC_DB2 | E-commerce | EC_DB_A | Linux | 16 |
| : | : | : | : | : | |

| CPU counts | Disk capacity | Disk used capacity | Cost |
|---|---|---|---|
| 4 | 500 | 100 | 0.4 |
| 2 | 10 | 2 | 0.2 |
| 4 | 500 | 200 | 0.4 |
| : | : | : | : |

FIG.4

Storage configuration table
2410

| Volume-ID | VM-ID | Volume capacity | Volume used capacity | Cost |
|---|---|---|---|---|
| 1 | 1 | 250 | 50 | 0.1 |
| 2 | 1 | 250 | 50 | 0.1 |
| 3 | 3 | 100 | 10 | 0.2 |
| : | : | : | : | : |

Columns: 2411, 2412, 2413, 2414, 2415

FIG.5

VM performance table
2480

| VM-ID | Time | Time zone | Memory consumption | CPU consumption | Network packets | VM status |
|---|---|---|---|---|---|---|
| 1 | 2019-07-25 09:10:30 | PST | 1.5 | 100 | 50 | Running |
| 1 | 2019-07-25 09:10:40 | PST | 1.2 | 500 | 0.5 | Running |
| 1 | 2019-07-25 09:10:50 | PST | 1.4 | 200 | 50 | Shutdown |
| : | : | : | : | : | : | : |

Columns: 2481, 2482, 2483, 2484, 2485, 2486, 2487

| Sum of total resource consumptions | Sum of total costs |
|---|---|
| 250 | 150 |

SYSTEM AND METHOD FOR SUPPORTING OPTIMIZATION OF USAGE EFFICIENCY OF RESOURCES

CROSS-REFERENCE TO PRIOR APPLICATION

This application relates to and claims the benefit of priority from Japanese Patent Application number 2019-167514, filed on Sep. 13, 2019, the entire disclosure of which is incorporated herein by reference.

BACKGROUND

The present invention generally relates to optimization of usage efficiency of resources.

As of recent, the complexity of corporate information technology (IT) systems is increasing as the amount of data increases, and the amount of information to be monitored for management of IT systems is also increasing. PTL1 discloses technology for facilitating selection of resources to be newly allocated, by grouping calculator resources within a data center into optional cloud resources, and displaying the total capacity, available capacity, and usage rate, for each group, as a technology to efficiently monitor great amounts of information.

Meanwhile, great numbers of virtual machines (hereinafter abbreviated to "VM") are commonly being created everyday in the cloud. As operations continue, VMs that are substantially unused (hereinafter referred to as "idle VMs") are generated. Idle VMs typically include VMs that are completely unused, and VMs of which the rate of usage is markedly low. Great numbers of idle VMs are generated, and scarce resources and wasted costs due to these idle VMs become problematic, making preparation for appropriate system expansion plans difficult. Accordingly, PTL2 discloses technology for detecting idle VMs by querying users whether VMs are actually being used or not, and machine learning.

PTL1: U.S. Pat. No. 9,407,521
PTL2: U.S. Patent Application Publication No. 2019/0158362

SUMMARY

Users who have a large-scale cloud environment generally are running tens of thousands of VMs or more. Accordingly, even if only a few percent of the whole are candidates for idle VMs, the number of candidates for idle VMs will be in the order of hundreds or more. According to PTL2, users are queried, but it is not practical to query individual users regarding hundreds of candidates or more, and it is conceivable that receiving many queries will be a load on the user. Also, according to PTL1, even if the state of use of resources can be identified, there is no useful information serving as information representing effects of changing resource allocation (e.g., recovery or changing of resources).

An optimization support system that supports optimization of usage efficiency of resources identifies resource consumption and cost of each virtual machine, from management data. The management data includes data representing, for each of a plurality of virtual machines, attributes and cost of the virtual machine, and at least resource consumption out of resource consumption and resource usage rate of each of a plurality of types of calculation resources allocated to the virtual machine. The optimization support system displays a management user interface (UI) that is a UI representing both resource consumption and cost regarding the plurality of virtual machines.

Appropriate candidates for idle VMs can be quickly narrowed down from the perspective of both amount of resources used by VMs and cost.

BRIEF DESCRIPTION OF THE DRAWINGS

FIG. 3 illustrates a configuration of a VM configuration table;
FIG. 4 illustrates a configuration of a storage configuration table;
FIG. 5 illustrates a configuration of a VM performance table.

DESCRIPTION OF EMBODIMENTS

Figure 1:
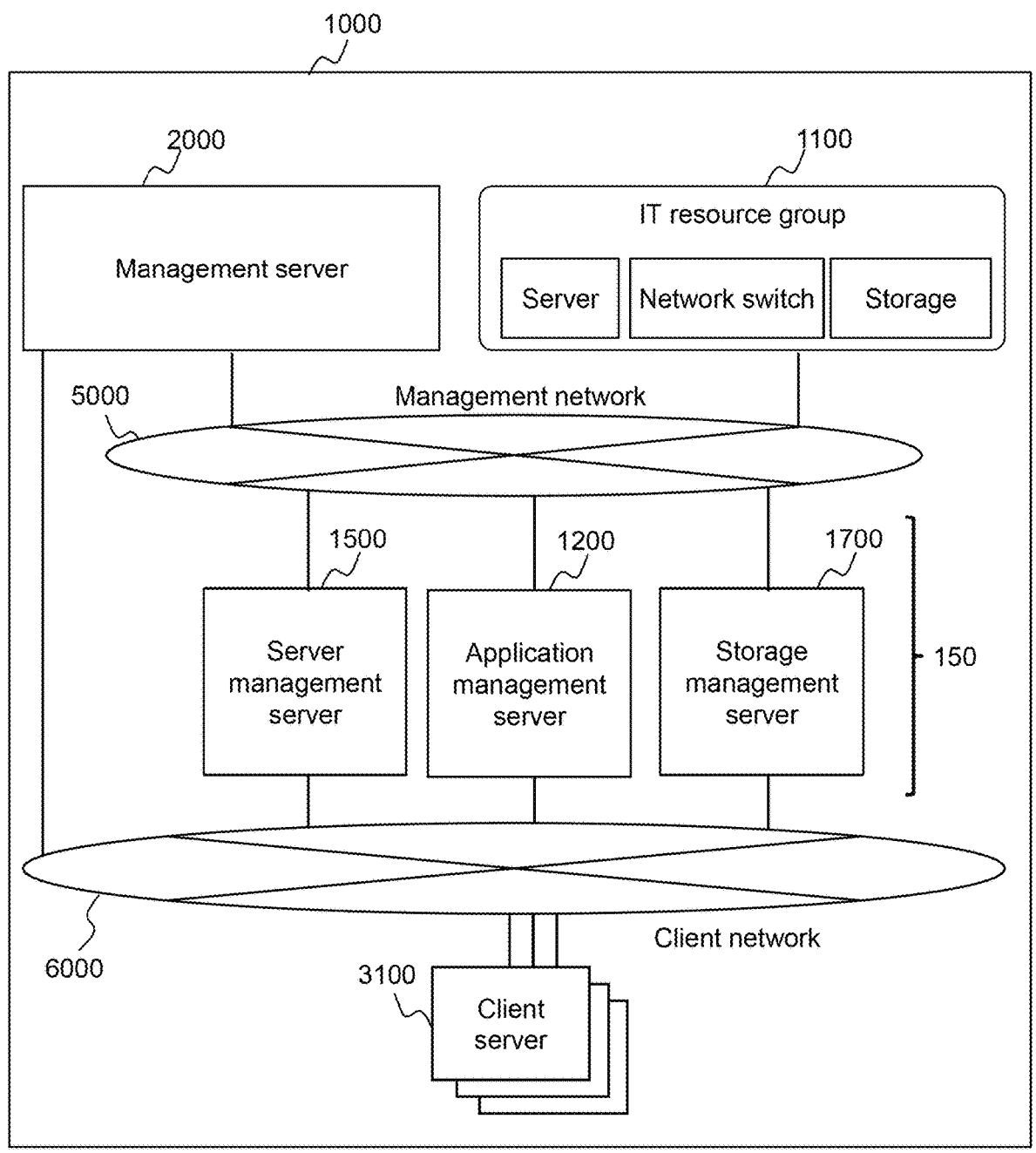
FIG. 1 illustrates an overall configuration of a calculator system according to an embodiment.

In the following description, the term "interface apparatus" may refer to one or more interface devices. The one or more interface devices may be at least one of the following.

One or more input/output (I/O) interface devices. An input/output (I/O) interface device is a device serving as an interface as to at least one of an I/O device and a remote calculator for display. The I/O interface device as to the calculator for display may be a communication interface device. At least one I/O device may be a user interface device, such as either of an input device like a keyboard and pointing device, and an output device like a display device, for example.

One or more communication interface devices. One or more communication interface devices may be one or more communication interface devices of the same type (e.g., one or more network interface cards (NICs)), or may be communication interface devices of two or more different types (e.g., NIC and host bus adapter (HBA)).

Also, in the following description, the term "memory" refers to one or more memory devices, and typically may be a main storage device. At least one memory device in memory may be a volatile memory device or may be a nonvolatile memory device.

Also, in the following description, the term "persistent storage apparatus" refers to one or more persistent storage devices. A persistent storage device typically is a nonvolatile storage device (e.g., an auxiliary storage device), and specifically is a hard disk drive (HDD) or solid state drive (SSD), for example.

Also, in the following description, the term "storage apparatus" may refer to, out of memory and a persistent storage apparatus, at least memory.

Also, in the following description, the term "processor" refers to one or more processor devices. At least one processor device typically is a microprocessor device such as a central processing unit (CPU), but may be a processor device of another type, such as a graphics processing unit (GPU). At least one processor device may be single-core or may be multi-core. At least one processor device may be a processor core. At least one processor device may be a processor device in the broad sense of the term, such as a hardware circuit that performs part or all of processing (e.g., a field-programmable gate array (FPGA) or application-specific integrated circuit (ASIC)).

Also, in the following description, expressions like "abc table" may be used to describe information where output is obtained with regard to input, but this information may be data of any structure, and may be a learning model such as a neural network that generates output with regard to input. Accordingly, "abc table" can be said to be "abc information". Also, configurations of tables in the following description are exemplary. One table may be divided into two or more tables, and all or part of two or more tables may be one table.

Also, processing may be described in some cases using "program" as the subject in the following description, but programs are executed by a processor to carry out given processing as appropriate, while using storage apparatuses and/or interface apparatuses or the like, so the subject of processing may be processor (or alternatively, a device like a controller that has the processor). A program may be installed into an apparatus such as a calculator from a program source. A program source may be a program distribution server or a calculator-readable (e.g., non-transitory) recording medium, for example. Also, in the following description, two or more programs may be realized as one program, and one program may be realized as two or more programs.

Also, in the following description, IDs are used as identification information of elements, but other types of identification information may be used instead or in addition thereto.

Also, in the following description, the term "user" may refer to a group such as a corporation or an organization within a corporation, or may refer to an individual such as an employee within a corporation.

Also, while "VM" is an abbreviation of virtual machine, a virtual machine is a program execution environment that is generated and deleted by virtualization technology in the following description. Accordingly, the term "virtual machine" may refer to a machine that is generated and deleted by server virtualization technology, or may be a container generated and deleted by container virtualization technology, for example.

FIG. 1 illustrates the overall configuration of an IT system according to an embodiment of the present invention.

The IT system 1000 has a management server 2000, a client server 3100, a server system 150 (e.g., an application management server 1200, a server management server 1500, and a storage management server 1700), an IT resource group 1100, a management network 5000, and a client network 6000. The IT resource group 1100 is a plurality of calculation resources including a plurality of types of calculation resources, which include resources of types such as server, network switch, and storage, for example. The calculation resources of the IT resource group 1100 may be physical resources such as memory and processors, or may be logical resources based on physical resources.

The management server 2000, server system 150, and client server 3100 are coupled to the client network 6000. The client network 6000 is a local area network (LAN) for example, but is not restricted to being a LAN.

The management server 2000, server system 150, and IT resource group 1100 are coupled to the management network 5000. The management network 5000 is a LAN for example, but is not restricted to being a LAN.

While the management network 5000 and client network 6000 are separate in the present embodiment, these networks may be the same (integral) network.

The client server 3100 may be a calculator (e.g., a personal computer or smartphone) used by a user (e.g., an employee within a corporation), or may be a server accessed from the calculator. The client server 3100 and server system 150 make up a client-server type system. A so-called three-tiered client-server system is realized in the present embodiment, and accordingly, the server system 150 includes the server management server 1500, application management server 1200, and storage management server 1700 exemplified in FIG. 1. The server management server 1500 may be a server belonging to the presentation layer (e.g., a Web server). The application management server 1200 may be a server belonging to the application layer. The storage management server 1700 may be a server (e.g., database server) belonging to the data layer. VMs according to virtualization technology are generated and run on at least one of the servers 1500, 1200, and 1700 in the server system 150. Calculation resources in the IT resource group 1100, for example, are allocated to VMs. For example, the server system 150 having a plurality of types of virtual resources is constructed on the basis of a plurality of types of physical resources belonging to the IT resource group 1100, and VMs to which part of the plurality of types of virtual resources in the server system 150 are allocated are generated in the server system 150.

The management server 2000 is an example of an optimization support system. An optimization support system may be configured of one or more calculators, or may be a system realized on one or more calculators. Displaying of information by the management server 2000 may be performed by displaying information on a display device if the management server 2000 has a display device, or by transmitting information for display to a remote calculator (e.g., the client server 3100 or a calculator coupled to the client server 3100) (in the case of the latter, content that the information for display represents is displayed by the remote calculator).

Although the management server 2000, client server 3100, server management server 1500, application management server 1200, storage management server 1700, and IT resource group 1100 are separate in the present embodiment, this mode is not restrictive. For example, a mode may be employed where there is no management server 2000, and one or more functions of the management server 2000 are implemented in at least one of the server system 150 and client server 3100.

In the present embodiment, the management server 2000 classifies the plurality of VMs into a plurality of VM groups, by owner of the VMs, application to which the VMs belong, and specifications of the VMs (e.g., operating system (OS) of the VMs). The management server 2000 calculates, for each of the plurality of VM groups, each of the resource usage rate of the VM group (e.g., average of resource usage rate of one or more VMs making up the VM group), the total resource consumption of the VM group (total of resource consumptions of one or more VMs making up the VM group), and total cost of the VM group (total of costs of one or more VMs making up the VM group). The management server 2000 draws a graphical user interface (GUI) that simultaneously displays the resource usage rate, total resource consumption, and total cost, for each of at least part of the VM groups of the plurality of VM groups. The user can narrow down candidates for idle VMs taking into consideration the effects of reduction regarding both total resource consumption and total cost.

Figure 2:
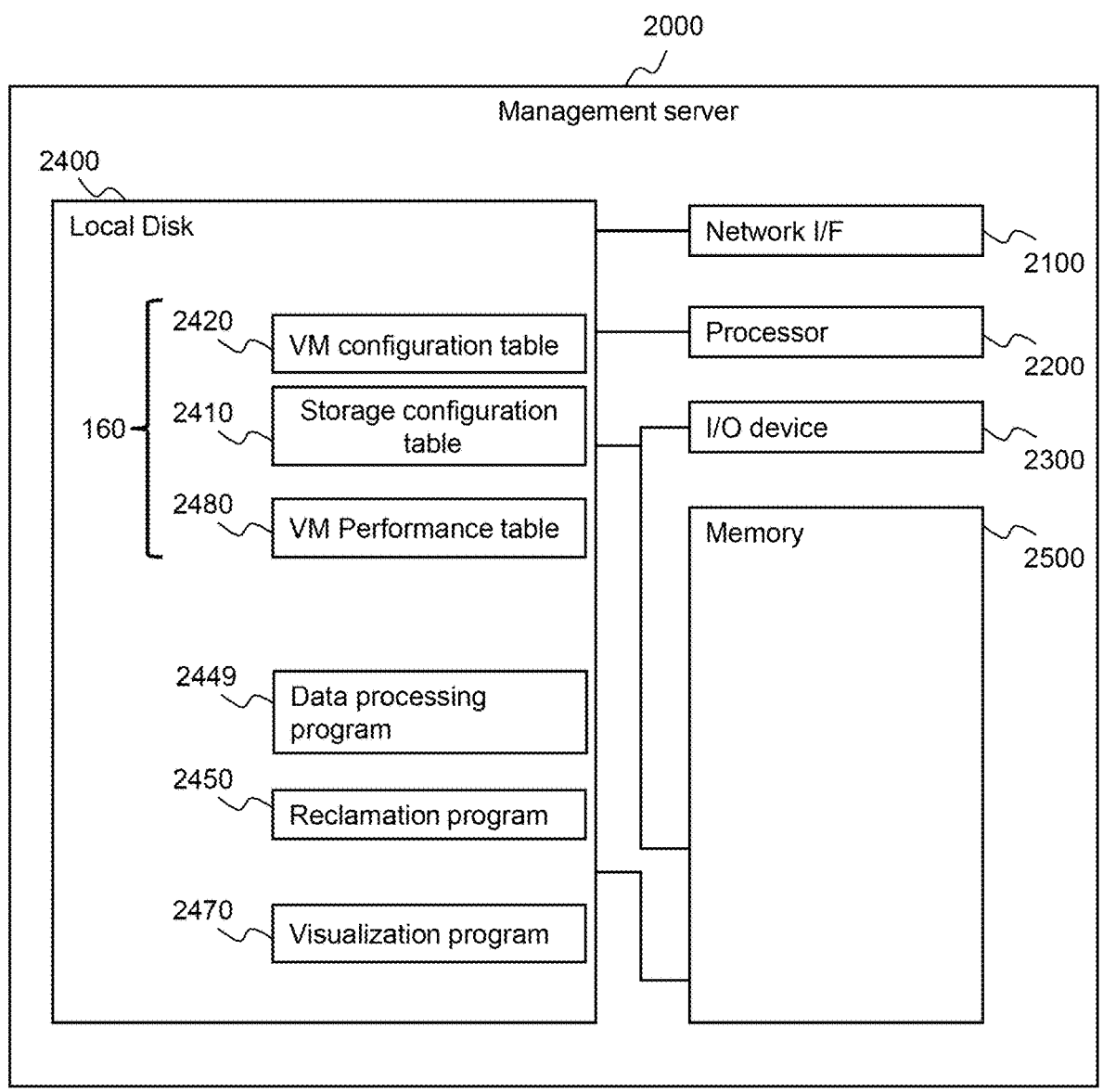
FIG. 2 illustrates a configuration of a management server.

FIG. 2 illustrates the configuration of the management server 2000.

The management server 2000 has a network I/F 2100, an I/O device 2300, a local disk 2400, memory 2500, and a processor 2200 coupled to these. The network I/F 2100 is an example of an interface apparatus. The local disk 2400 is an example of a persistent storage apparatus.

The network I/F 2100 couples the management server 2000, management network 5000, and client network 6000. The I/O device 2300 is a user interface device, such as a display device like a monitor, an input device like a keyboard and mouse, and so forth.

The local disk 2400 stores data and programs. There is management data 160 as data. The management data 160 includes, for example, a VM configuration table 2420, a storage configuration table 2410, and a VM performance table 2480. Examples of programs include a data processing program 2449, a reclamation program 2450, and a visualization program 2470.

Programs such as the programs 2449, 2450, and 2470 are loaded to the memory 2500 and executed by the processor 2200. Accordingly, functions such as a data processing unit, reclamation unit, and visualization unit, respectively corresponding to the data processing program 2449, reclamation program 2450, and visualization program 2470, are realized. Processing by these programs 2449, 2450, and 2470 will be described later.

The VM configuration table 2420, storage configuration table 2410, and VM performance table 2480 are loaded to the memory 2500, and used by at least one of the programs 2449, 2450, and 2470. Details of these tables 2420, 2410, and 2480 will be described later.

FIG. 3 illustrates the configuration of the VM configuration table 2420.

The VM configuration table 2420 holds information relating to the VM configuration, more specifically, information relating to attributes and costs of the VM. The VM configuration table 2420 has a record for each VM, and has columns 2421 through 2430 as columns, for example. One VM will be taken as an example ("object VM" in the description of FIG. 3).

Column 2421 includes information indicating VM-ID (the ID of the object VM). Column 2422 includes information indicating the VM name (name of the object VM). Column 2423 includes information indicating the owner name (name of the owner, such as an organization that owns the object VM). Column 2424 includes information indicating the application name (name of the application to which the object VM belongs). Column 2425 includes information indicating the OS name (name of the OS of the object VM). Column 2426 includes information indicating the memory capacity (capacity of virtual memory of the object VM). Column 2427 includes information indicating the CPU counts (count of virtual CPUs of the object VM). Column 2428 includes information indicating disk capacity (capacity of the disk of the object VM). Column 2429 includes information indicating disk used capacity (capacity that has already been used out of the disk capacity). Column 2430 includes information indicating cost (price per unit time of the object VM).

In this way, independent resource types, such as CPUs, memory, and disks, exist in VMs. The term "independent resource types" means that the resource consumption of one resource type is independent from the resource consumption of another different resource type. Accordingly, a situation can occur where the memory usage rate is high but the CPU usage rate is low, for example.

At least one of VM-ID, VM name, owner name, application name, OS name, memory capacity, CPU counts, disk capacity, and disk used capacity is an example of attributes of the VM. Although VM attributes are sets of attribute items and attribute values in the present embodiment, VM attributes are equivalent to at least attribute values. In a case where an attribute item is the owner name, an example of the attribute value is "E-commerce".

Also, although cost per unit time of the VM is employed as an example of cost, cost may be defined otherwise. Also, the term "application" in the present embodiment means an entire service such as attendance management or expense adjustment, and is realized by a plurality of (or one) VMs.

Hereinafter, a VM of which the value of VM-ID is "a" will be referred to as "VMα". This is as follows in the example in FIG. 3. The name of VM1 is "EC_DB1" (meaning database 1 for E-commerce application), the owner of the VM1 (e.g., an owning organization) is an organization named "E-commerce", and the OS of the VM1 is Linux (registered trademark). The VM1 makes up an application called "EC_DB_A". Also, as for specifications of the VM1, 16 GB of memory, four virtual CPUs, and 500 GB of disk are allocated to the VM with 100 GB of the 500 GB of disk have been used already. Also, as for the cost of the VM1, the usage fee is 0.4 dollars per hour. The VM3 is used by the same owner E-commerce as the VM1, and makes up the same application called "EC_DB_A".

Other attributes, such as the region to which the VM belongs (e.g., the region where the calculator is (e.g., data center) on which the VM is realized) for example, may be employed instead of or in addition to part of the above-described attributes, as attributes of the VM. The region may be nation, state, or municipality.

FIG. 4 illustrates the configuration of the storage configuration table 2410.

The storage configuration table 2410 holds information relating to the configuration of external storage that the VM uses. The storage configuration table 2410 has a record for each volume (storage region in external storage), and has columns 2411 through 2415 as columns, for example. One volume will be taken as an example ("object volume" in the description of FIG. 4).

Column 2411 includes information indicating Volume-ID (ID of the object volume). Column 2412 includes information indicating VM-ID (ID of the VM to which the object volume has been allocated). Column 2413 includes information indicating volume capacity (capacity of object volume). Column 2414 includes information indicating volume used capacity (capacity that has already been used out of the volume capacity). Column 2415 includes information indicating cost (price per unit time and/or unit capacity of object volume). A VM may not necessarily have a volume allocated thereto.

Hereinafter, a volume of which the value of Volume-ID is "13" will be referred to as "Volume β". This is as follows in the example in FIG. 4. The volume 1 is allocated to the VM1. The capacity of the volume 1 is 250 GB, the used capacity of volume 1 is 50 GB, and the price per GB per month of the volume 1 is 0.1 dollars. The cost of the VM1 can be calculated from column 2430 exemplified in FIG. 3 and column 2415 exemplified in FIG. 4.

FIG. 5 illustrates the configuration of the VM performance table 2480.

The VM performance table 2480 holds information relating to performance of the VMs. The term "performance of VM" in the present embodiment does not refer to performance in the narrow sense, such as input/output performance, but rather refers to performance in the broad sense, meaning general metrics that can be collected, such as memory usage rate and memory consumption. The VM performance table 2480 has a record for each VM, and has columns 2481 through 2487 as columns, for example. One VM will be taken as an example ("object VM" in the description of FIG. 5). Various types of performance regarding each VM are periodically (or aperiodically) collected by the data processing program 2449 and recorded in the VM performance table 2480, for example. Also, units of clock time are not restricted to year, month, day, hour, minute, second. Although VM performance is sets of performance items and performance values in the present embodiment, VM performance is equivalent to at least performance values. In a case where a performance item is "memory consumption", an example of the performance value is "1.5 GB".

Column 2481 includes information indicating VM-ID (ID of the object VM). Column 2482 includes information indicating clock time (clock time at which the performance of the object VM was obtained). Column 2483 includes information indicating the time zone (time zone for the clock time at which the performance of the object VM was obtained). Column 2484 includes information indicating memory consumption (consumption of virtual memory of the object VM, which is one of performances obtained at this clock time regarding the object VM). Column 2485 includes information indicating CPU consumption (consumption of virtual CPUs of the object VM, which is one of performances obtained at this clock time regarding the object VM). Column 2486 includes information indicating packet transfer amount (count or amount of packets transferred per unit time by the object VM, which is one of performances obtained at this clock time regarding the object VM). Column 2487 includes information indicating the VM status (status of this VM at this clock time).

This is as follows in the example in FIG. 5. Performance was collected regarding the VM1 at the clock time of 10 minutes 30 seconds past 9 o'clock on Jul. 25, 2019, this clock time being clock time in the Pacific Standard Time (PST) time zone. At this clock time, memory consumption of "1.5 GB", CPU consumption of "100 MHz", and packet transfer amount of "50 KB" were obtained, and also VM status of "Running" was obtained, with regard to the VM1.

Figure 6:
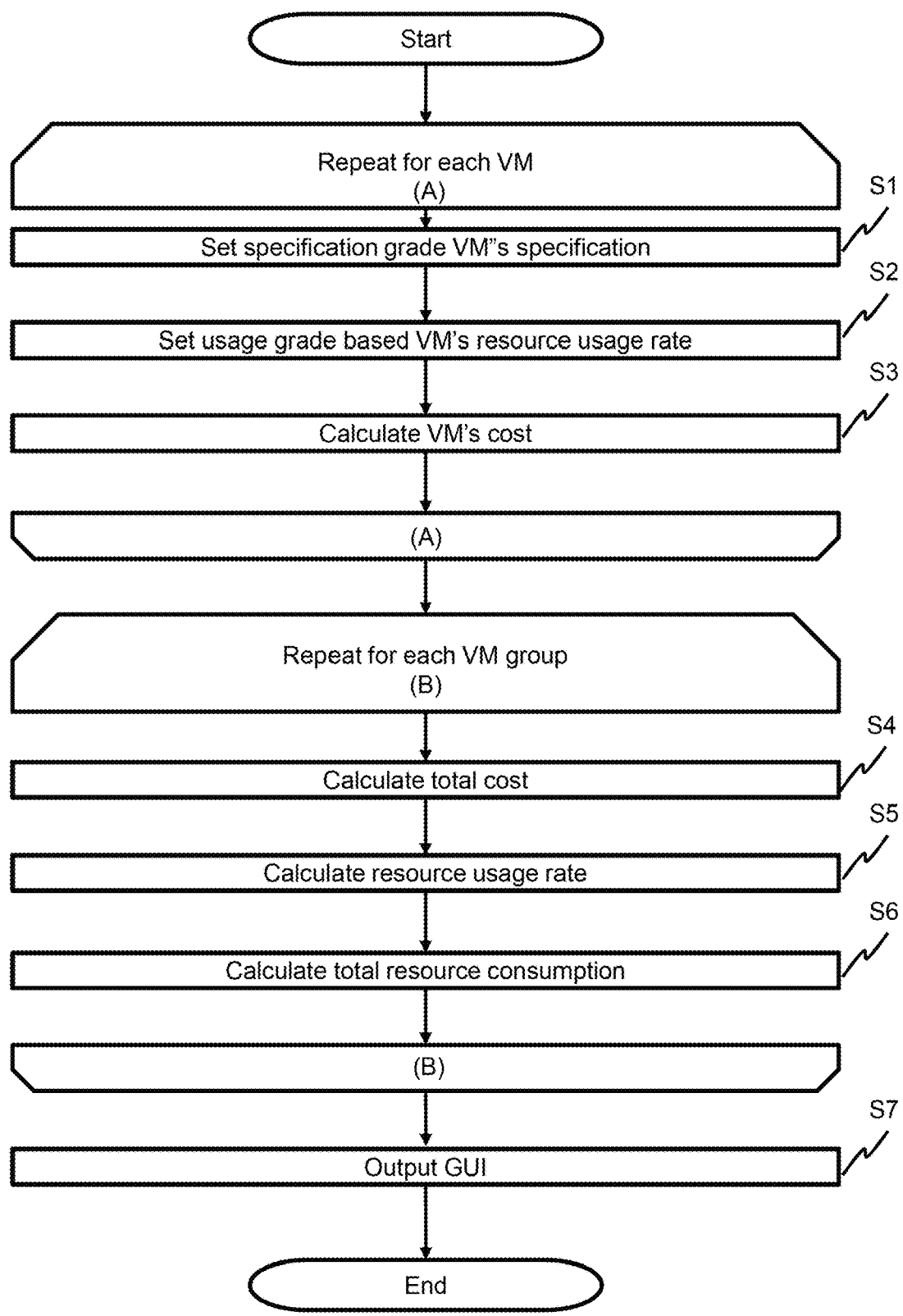
FIG. 6 illustrates a flow of visualization processing.

FIG. 6 illustrates a flow of visualization processing.

Visualization processing is performed in response to a draw command, for example. A draw command may be a call request by an optional URL by the user, or may be another command.

Loop (A) is executed. In loop (A), S1 through S3 is carried out for each of all VMs that the management data 160 represents. One VM will be taken as an example ("object VM" in the description of S1 through S3).

The data processing program 2449 classifies the object VM into one of specification grades in accordance with the specifications of the object VM, on the basis of the VM configuration table 2420 (S1). Specification grades into which classification is performed are dependent on attribute values of one type or more of VM attribute items belonging to the specifications of the object VM. For example, an arrangement may be made where if the memory capacity is 0 GB or more and less than 2 GB, the object VM is classified to a specification grade 1, and if the memory capacity is 2 GB or more and less than 8 GB, the object VM is classified to a specification grade 2. Also, the object VM may be classified by a combination of memory capacity and CPU count. An attribute value range corresponding to the specification grade may be defined for each of the one type or more of VM attribute items belonging to the VM specifications, for each specification grade. The specification grade into which classification of the object VM is performed may be decided depending on which grade of attribute value range the attribute value of which VM attribute item (e.g., memory capacity, CPU counts, disk capacity) serving as an element of specifications of the object VM belongs to. The specification grade of the object VM is used to display a later-described detailed GUI. The detailed GUI facilitates decisions made by the user regarding specifications of the object VM after changing specifications.

The data processing program 2449 classifies the object VM into one of usage grades in accordance with resource usage rate of an optional or predetermined resource type and/or resource consumption of the object VM, on the basis of the VM performance table 2480 (S2). The usage grade into which classification is performed is dependent on the resource usage rate of one type or more of calculation resources and/or resource consumption. For example, an arrangement may be made where if the memory usage rate is 0% or more and less than 10%, the object VM is classified to a usage grade 1, and if the memory consumption is 2 GB or more and less than 8 GB, the object VM is classified to a usage grade 2. A range of the resource usage rate and/or resource consumption of the calculation resources may be defined for each of the one type or more of calculation resources, for each usage grade. In a case where the resource consumption of the object VM is to be used for classification, the resource consumption may be normalized in accordance with the resource amount allocated to the object VM, and the normalized resource consumption may be compared with the range defined for the usage grade. The usage grade into which the object VM is classified may be decided by the resource usage rate and/or resource consumption of which type of resources of the object VM belong to the range of which grade. In this way, the usage grade of the object VM may be decided regarding each of one or more types of calculation resources. The usage grade of the object VM is used for display of a later-described overview GUI. The overview GUI facilitates decisions made by the user regarding which VM group is to be set as a selection source for idle VMs.

Note that the resource consumption of the object VM may be the resource consumption at an optional clock time, or may be the resource consumption in an optional period. The resource consumption in an optional period may be a resource consumption decided in accordance with a predetermined rule on the basis of a plurality of resource consumptions (e.g., average value, maximum value, minimum value, or median value) corresponding to each of a plurality of clock times belonging to the optional period. Also, the resource usage rate of the object VM may be a value calculated by the data processing program 2449, for example, on the basis of the resource amount (resource amount identifiable from the VM configuration table 2420) and resource consumption (resource consumption identifiable from the VM performance table 2480) of the object VM.

The data processing program 2449 calculates the cost of the object VM on the basis of the VM configuration table 2420, storage configuration table 2410, and VM performance table 2480 (S3).

In a case where no volume has been allocated to the object VM, the calculated cost of the object VM is a cost in accordance with a cost X (cost X itself, or a value that has been decided on the basis of cost X). Cost X is a cost calculated from cost identifiable from the VM configuration table 2420 regarding the object VM (price per unit time), and running period identifiable from the VM performance table 2480 regarding the object VM.

In a case where a volume has been allocated to the object VM, the calculated cost of the object VM is a cost in accordance with cost X and a cost Y (e.g., sum of cost X and cost Y, or a value decided on the basis of the sum). Cost Y is a cost calculated on the basis of a cost identifiable from the storage configuration table 2410 regarding the volume that has been allocated to the object VM (price per unit time and/or unit capacity), and the volume capacity of the volume allocated to the object VM or the used capacity thereof that is a value identifiable from the storage configuration table 2410 (and/or running period identifiable from the VM performance table 2480 regarding the object VM).

The running period of the object VM may be identified by another method, in addition to or instead of referencing the VM performance table 2480. For example, a period from the clock time of generating the object VM to the current clock time may be deemed to be the running period.

After loop (A), loop (B) is carried out. In loop (B), S4 through S6 is carried out for each of all VM groups. One VM group will be taken as an example ("object VM group" in the description of S4 through S6). Note that VM groups are decided on the basis of the VM configuration table 2420 at least before starting loop (B), by the data processing program 2449 for example. A VM group is configured of VMs regarding which, out of one or more types of attributes of the VMs, at least the application is the same. In the present embodiment, a VM group is a set of VMs where a combination of owner name, application name, OS name, and specification grade and/or usage grade is the same.

The data processing program 2449 calculates the total cost of the object VM group (S4). The total cost of the object VM group is the summation of the costs of all VMs belonging to the object VM group (cost calculated in S3 regarding each VM), for example.

The data processing program 2449 calculates the resource usage rate of the object VM group (S5). The resource usage rate of the object VM group is a resource usage rate (e.g., average value, maximum value, minimum value, or median value) based on resource usage rates of all VMs belonging to the object VM group.

The data processing program 2449 calculates the total resource consumption of the object VM group (S6). The total resource consumption of the object VM group may be calculated for each of one type of resource type, for example. Specifically, the total resource consumption of the object VM group may be at least one of total memory consumption, total CPU count, and total packet transfer amount, for example. The total memory consumption of the object VM group is the summation of the memory consumptions of all VMs belonging to the object VM group, for example. The total CPU count of the object VM group is the summation of CPU counts of all VMs belonging to the object VM group, for example. The total packet transfer amount of the object VM group is the summation of packet transfer amounts of all VMs belonging to the object VM group, for example.

After loop (B), the visualization program 2470 displays a management GUI, which is a GUI that represents both resource consumption and costs (S7). There are an overview GUI and a detailed GUI in management GUIs. The overview GUI represents both total resource consumption and total cost for each of a plurality of VM groups. The detailed GUI represents both resource consumption and cost for each of a plurality of VMs. In the present embodiment, a detailed GUI is displayed for a plurality of VMs belonging to one or more VM groups satisfying predetermined conditions out of a plurality of VM groups represented in the overview GUI. The phrase "one or more VM groups satisfying predetermined conditions" may mean complying with a policy in which at least one of total resource consumption, resource usage rate, total cost, specification grade, and usage grade has been set beforehand, but in the present embodiment, means a VM group selected from the overview GUI by the user. The user can select one or more VM groups from the overview GUI to set as the selection source for candidates for idle VMs.

Figure 7:
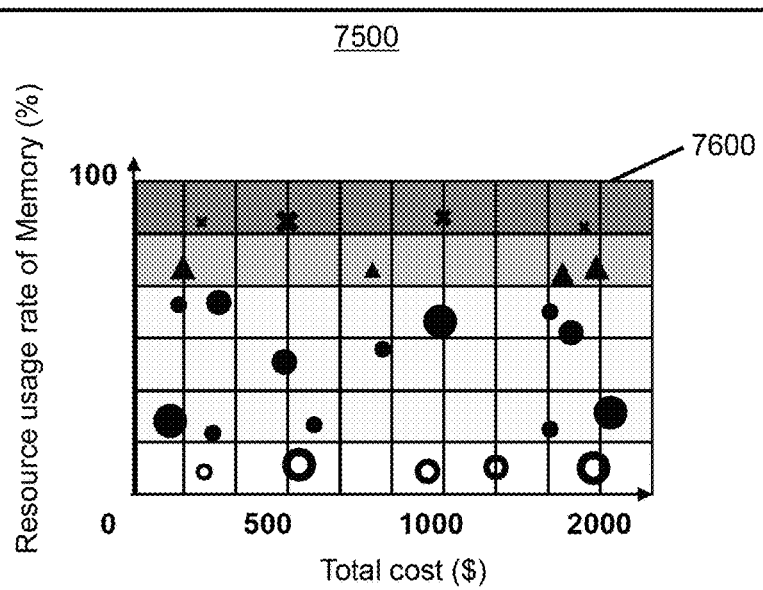
FIG. 7 illustrates an example of an overview graphical user interface (GUI)
Figure 7:
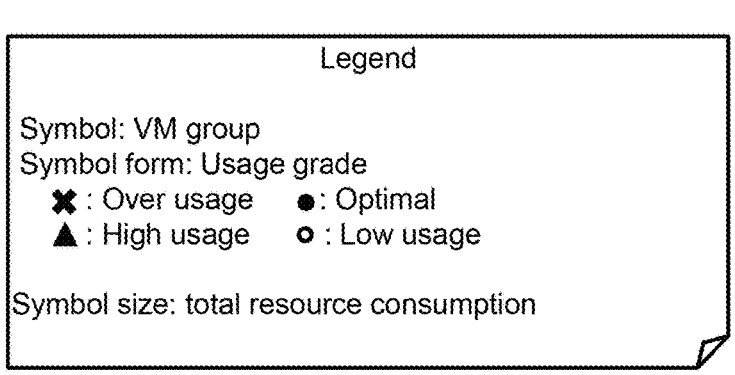

FIG. 7 illustrates an example of an overview GUI.

The overview GUI 7500 has an overview chart 7600 that is an X-Y coordinate plane. The overview chart 7600 is a chart representing the resource usage rate, total resource consumption, and total cost of a plurality of VM groups, for example.

Each symbol on the overview chart 7600 represents a VM group. The X axis corresponds to the total cost of VM groups. The Y axis corresponds to resource usage rate of a resource type of interest. The visualization program 2470 plots symbols of the VM groups at coordinates (positions) corresponding to the resource usage rate and total cost of the VM group on the overview chart 7600. Note that symbols of all VM groups may be plotted on the overview chart 7600, or symbols of a predetermined number or less out of VM groups conforming to predetermined conditions may be plotted. Also, the term "resource type of interest" may be an optional resource type out of a plurality of resource types, and may be a resource type specified by the user, or may be a resource type of resources regarding which abnormality has been detected in performance values by the data processing program 2449 (or a different program), for example. Also, if a volume has been allocated to at least one VM in the VM group, the cost of the volume is referenced in the cost of this VM, so the cost of the volume is reflected in the total cost of this VM group.

Of display modes of symbols of each VM group, one mode (e.g., shape) may be dependent on the usage grade of the VM group. The darkness of background color of the overview chart 7600 indicates the usage grade of the resource usage rate described earlier. The darker the color is, this means the higher the resource usage rate is (in other words, the lighter the color is, this means the lower the resource usage rate is).

Of the display modes of symbols of each VM group, a different one mode (e.g., size) is dependent on the total resource consumption of the VM group (total resource consumption regarding the resource type of interest).

According to the present embodiment, the user can comprehend at a glance the relation between total cost, resource usage rate, and total resource consumption, for each owner and application of a VM group by referencing the overview chart 7600. For example, the user can judge that a VM group that has a low resource usage rate but has a large total resource consumption to be highly likely to include idle VMs, and accordingly that there is a good probability of being able to recover large amounts of resources. The user can then drill down by displaying a detailed GUI for this VM group, to prepare a detailed resource recovery plan for this VM group. The user can also judge VM groups regarding which large costs can likely be reduced, besides resource amounts, by viewing the total cost in addition to the total resource consumption. Thus, VM groups suitable for the user policy can be judged.

Also, optimization work such as resizing (changing specifications), recovery, and so forth of VMs may affect programs that are executed on VMs by stopping or deleting VMs. Accordingly, the user can compare the owner of a VM with the ease of optimizing the VM, and if a VM is suitable for optimization from the perspective of reducible resource amount and cost but the VM is running a program that is important to the owner (due to the VM belonging to an application with a high degree of importance), can judge not to make this VM the object of optimization, for example.

Note that the resource type of interest corresponding to the Y axis preferably is a resource type of a resource that the user desires to optimize by VM recovery (or VM resizing), and may be any of virtual memory, virtual CPU, and virtual disk. The performance recorded in the VM performance table 2480 may be disk consumption (used capacity of virtual disk allocated to VM), instead of or in addition to at least one of the plurality of performances exemplified in FIG. 5. An arrangement may also be made where the resource usage rate corresponds to the X axis and total cost corresponds to the Y axis. An arrangement may also be made where the total cost affects one of display modes of symbols of the VM group, and the total resource consumption corresponds to the X axis or Y axis instead of total cost.

Also, in a case where one or more VM groups have been selected by the user, a table representing the sum of total resource consumption and sum of total costs may be displayed by the visualization program 2470 regarding the one or more selected VM groups, as exemplified in FIG. 7. The sum of total resource consumption may be displayed according to resource types (e.g., for each of memory, CPU, and disk).

An example of visualization supporting a detailed resource recovery plan is a detailed GUI.

Figure 8:
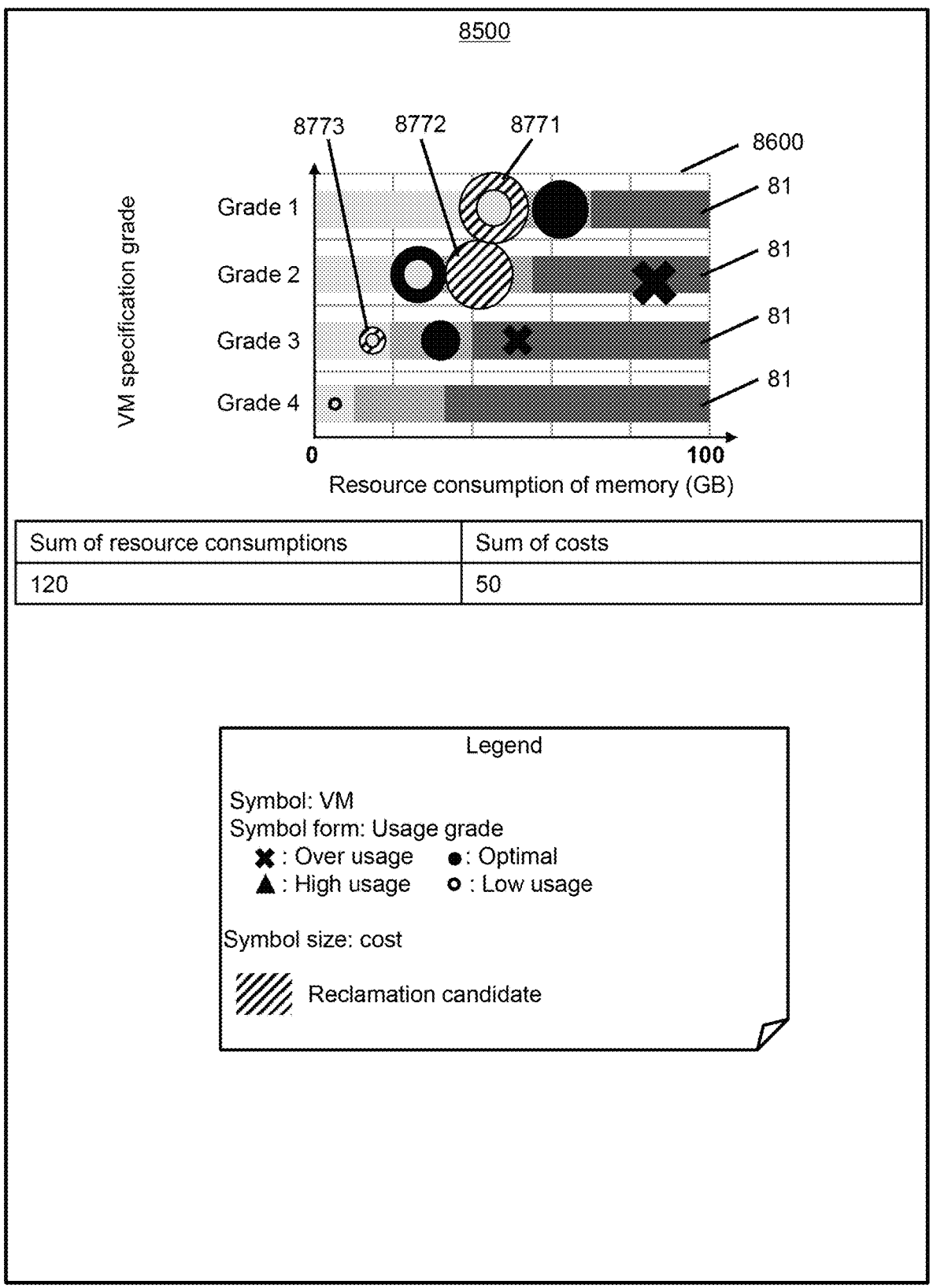
FIG. 8 illustrates an example of a detailed GUI.

FIG. 8 illustrates an example of a detailed GUI.

The detailed GUI 8500 has a detailed chart 8600 that is an X-Y coordinate plane. The detailed chart 8600 is a chart representing a plurality of VMs belonging to a VM group that has been narrowed down to in the overview chart 7600 exemplified in FIG. 7, for example.

The symbols on the detailed chart 8600 indicate VMs belonging to a VM group narrowed down in the overview chart 7600. The X axis corresponds to the resource consumption of the resource type of interest. The Y axis corresponds to the specification grade of the VM. The visualization program 2470 plots symbols of the VMs at coordinates (positions) corresponding to the resource consumption and specification grade of the VM on the detailed chart 8600. Note that symbols of all VMs belonging to the narrowed down VM group may be plotted on the detailed chart 8600, or symbols of a predetermined number or less out of VMs conforming to predetermined conditions may be plotted.

Of display modes of symbols of each VM, one mode (e.g., shape) is dependent on the usage grade (usage grade corresponding to the resource type of interest) of the VM.

The darkness of background color of the detailed chart 8600 indicates the usage grade (grade of resource usage rate) of the resource type of interest, for each specification grade. The darker the color is, this means the higher the resource usage rate is (in other words, the lighter the color is, this means the lower the resource usage rate is). In the example in FIG. 8, there is a band 81 extending parallel to the X axis, for each specification grade. The appropriate range for resource consumption differs depending on the specification grade. This is because allocated resource amounts differ depending on the specification grade, and accordingly the resource usage rate is different even if the resource consumption is the same. The darkness of each part of the band 81 corresponding to the usage grade is dependent on the appropriateness of resource consumption corresponding to this part (relevant resource usage rate), for each specification grade.

Of the display modes of symbols of each VM, a different one mode (e.g., size) is dependent on the cost of this VM.

VMs decided (detected) by the reclamation program 2450 to be candidates for idle VMs are explicitly shown. Specifically, symbols of VMs that are candidates for idle VMs are displayed highlighted, for example. An example of highlighted display is a hatched display. The reclamation program 2450 decides, for each VM, whether the VM is a candidate for an idle VM, on the basis of the resource usage rate and resource consumption calculated by the data processing program 2449 (and running period of the VM), before S7 in FIG. 6 starts.

According to the present embodiment, the user can simultaneously identify at a glance VMs with high costs that can be reduced by recovering, VMs with large resource amounts that can be recovered, and VMs that have a low usage rate and are candidates for recovery (i.e., VMs that are candidates for idle VMs), by referencing the detailed chart 8600. As one example, the user can perform identification such as described below.

A VM corresponding to symbol 8771 ("VM of interest" at this stage) is a candidate for an idle VM. The darkness of the band part where the position of the symbol 8771 belongs is light, so the resource usage rate of the resource type of interest is low regarding the VM of interest. However, the resource consumption of the resource type of interest is not low regarding the VM of interest. The symbol 8771 also is relatively large. Accordingly, reduction of a relatively large amount of resources and relatively large cost can be expected by recovering (e.g., deleting) the VM of interest. The user may decide the VM of interest to be a VM that is the object of recovery from this perspective.

A VM corresponding to symbol 8772 ("VM of interest" at this stage) is a candidate for an idle VM. The darkness of the band part where the position of the symbol 8772 belongs is a midway darkness, so the resource usage rate of the resource type of interest is appropriate regarding the VM of interest. However, the VM of interest is a candidate for an idle VM, so it can be estimated that the resource usage rate is low regarding at least one resource type other than the resource type of interest. Further, the resource consumption of the resource type of interest is not low regarding the VM of interest. The symbol 8772 also is relatively large. Accordingly, reduction of a relatively large amount of resources and relatively large cost can be expected by recovering the VM of interest. The user may decide the VM of interest to be a VM that is the object of recovery from this perspective.

A VM corresponding to symbol 8773 ("VM of interest" at this stage) is a candidate for an idle VM. The darkness of the band part where the position of the symbol 8773 belongs is light, so the resource usage rate of the resource type of interest is low regarding the VM of interest. However, the resource consumption of the resource type of interest is low regarding the VM of interest. The symbol 8773 also is relatively small. Accordingly, reduction in relatively large resource amounts or relatively large cost reductions cannot be expected even if this VM of interest is recovered. Therefore, resizing, where the specification grade of the VM of interest is lowered (the resource amount in the specifications of the VM of interest is reduced) is studied, to make the grade of resource usage rate of the VM of interest to be appropriate. In the detailed chart 8600, a plurality of bands 81 corresponding to each of the plurality of specification grades extend in parallel to the X axis. The darkness of each part of the band 81 is a darkness corresponding to the usage grade of the resource usage rate that is obtained on the basis of the resource consumption in accordance with that part and the specification grade corresponding to that band 81. Accordingly, the user can tell at a glance which grade the specification grade of the VM of interest should be in, for the resource usage rate according to the resource consumption of the VM of interest to be appropriate. In the example in FIG. 8, the resource usage rate of the resource type of interest can be expected to be made appropriate regarding the VM of interest by relegating the specification grade of the VM of interest from grade 3 to grade 4. Thus, the color of the bar to which the symbol 8773 is vertically (parallel to the Y axis orthogonal to the X axis corresponding to resource consumption) slid is the resource usage rate after resizing. The user can simulate the resource usage rate after resizing. Note that the resource usage rate after resizing may be dependent on the way in which resources are allocated to VMs (e.g., whether or not to reserve resources allocated to VMs, and whether or not to virtually allocate a greater amount of resources to VMs than the actually-existing amount of physical resources).

The specification grade may correspond to the X axis, and the resource consumption may correspond to the Y axis. Also, the resource consumption may affect one of the display modes of the symbols for VMs, and the total cost may correspond to the X axis or Y axis instead of the resource consumption.

In a case where the user has selected one or more VMs, the visualization program 2470 may also display a table representing the sum of resource consumptions and the sum of costs regarding the selected one or more VMs, as exemplified in FIG. 8. The sum of resource consumptions may be displayed according to resource type (e.g., for each of memory, CPU, and disk).

The above description can be summarized as follows, for example.

The management server 2000, which is an example of an optimization support system that supports optimization of usage efficiency of resources is provided with the data processing program 2449 and visualization program 2470. The data processing program 2449 identifies resource consumption and cost of each of the VMs, from the management data 160. The management data 160 includes, for each of the plurality of VMs, data representing the attributes and cost of that VM, and at least the resource consumption out of the resource consumption and resource usage rate of each of the plurality of types of calculation resources allocated to that VM. The visualization program 2470 displays a management GUI, which is a GUI (an example of UI) representing both resource consumption and cost regarding a plurality of VMs. Accordingly, the user can quickly narrow down appropriate candidates for idle VMs, from the perspective of both resource consumption and cost.

The data processing program 2449 may calculate total resource consumption and total cost for each of the plurality of VM groups, on the basis of the management data 160. The visualization program 2470 may display the overview GUI 7500 as a management UI. The overview GUI 7500 may be a GUI that represents both total resource consumption and total cost for each of at least part of the VM groups out of the plurality of VM groups. Accordingly, appropriate idle VMs can be macroscopically narrowed down from the perspective of total resource consumption and total cost.

The overview GUI 7500 has the overview chart 7600. The overview chart 7600 is a coordinate plane that has a Y axis (an example of first axis) corresponding to the resource usage rate of calculation resources of the resource type of interest (an example of object type out of a plurality of types of calculation resources), and an X axis (an example of second axis) corresponding to one of total resource consumption and total cost. Symbols for each of at least part of VM groups are plotted on the overview chart 7600, and the display mode of symbols of the VM groups may be dependent on the other of total resource consumption and total cost of the VM groups. Accordingly, narrowing down of idle VMs can be efficiently performed as described below, for example. That is to say, as an example of a trigger to increase available resource amount by recovering (or resizing) idle VMs, performing optimization regarding any one resource type due to an insufficient resource amount having been detected regarding the resource type, thereby creating an available resource amount, is conceivable. Accordingly, the resource type regarding which insufficient resource amount has been detected becomes the resource type of interest, and the resource usage rate corresponding to the resource type of interest is on the Y axis, so symbols of VM groups are disposed at positions corresponding to the resource usage rates of the VM groups in the Y-axial direction. When further narrowing down idle VMs from the perspective of both total resource consumption and total cost, the symbols of the VM groups are disposed in the X-axial direction in accordance with one of total resource consumption and total cost. The size of the symbols is dependent on the other of total resource consumption and total cost. Thus, an indication of resource usage rate, total resource consumption, and total cost of the VM groups can be easily comprehended.

The visualization program 2470 may display the detailed GUI 8500 as a management GUI. The detailed GUI 8500 may be a GUI that displays both the cost and the resource consumption of the calculation resources of the resource type of interest of the VM, regarding each of at least a part of VMs belonging to one or more VM groups out of the VM groups that the overview chart 7600 represents. Accordingly, idle VMs can be narrowed down from the perspective of both resource consumption and cost, from the VMs roughly narrowed down in the overview chart 7600.

The detailed GUI 8500 may have the detailed chart 8600. The detailed chart 8600 may be a coordinate plane having a Y axis (an example of third axis) corresponding to specification grade (an example of scale of VM), and an X axis (an example of fourth axis) corresponding to one of cost and resource consumption of calculation resources of the resource type of interest. Symbols of each of at least part of the VMs may be plotted on the detailed chart 8600. As for the display mode of the symbols of the VMs, there may be one type of display mode which is size, with the first type of display mode of the symbols of the VMs being dependent on the other of the cost of the VM and the resource consumption of the VM with regard to calculation resources of the resource type of interest. Accordingly, narrowing down of idle VMs can be efficiently performed as described below, for example. That is to say, resource usage rate differs depending on the specification grade even if the resource consumption is the same, so the specification grade is made to correspond to the Y axis, thereby disposing the symbols of VMs in the Y-axial direction in accordance with the specification grade of the VMs. The symbols of the VMs are also disposed in the X-axial direction in accordance with one of cost and resource consumption of calculation resources of the resource type of interest. The display mode of the symbols of the VMs is dependent on the other of the cost and resource consumption of calculation resources of the resource type of interest. Thus, an indication of specification grade, resource consumption, and cost of VMs can be easily comprehended.

Further, there may be a second type of display mode that is any one display mode other than size (e.g., color), as a display mode for symbols of each of at least part of VMs. The second type of display mode of symbols of the VMs may be dependent on the appropriateness of resource usage rate of the VMs. Thus, an indication of resource usage rate of VMs can be easily comprehended, in addition to specification grade, resource consumption, and cost thereof.

The detailed chart 8600 may further have a band 81 that extends from the Y axis in parallel to the X axis, for each specification grade. With regard to the calculation resources of the type of resource of interest, the range appropriate for the resource consumption differs depending on the specification grade. For each specification grade, the display mode (e.g., darkness) at each part of the band 81 corresponding to the specification grade may be dependent on the appropriateness of the resource consumption corresponding to that part, regarding calculation resources of the resource type of interest. Accordingly, if there is a symbol overlaid on a band part indicating that the resource usage rate is inappropriate (e.g., relatively low), it can be easily comprehended that the resource usage rate of the VM corresponding to that symbol is inappropriate. Also, with the X coordinate of the symbol of the VM substantially fixed, a Y coordinate of a band 81 having a band part showing that the resource usage rate is appropriate can be found as a Y coordinate for this symbol. That is to say, an appropriate specification grade of this VM can be quickly found, just by moving the viewpoint regarding the symbol of the VM in the Y-axial direction.

There may be, regarding each of at least a part of VM groups, a first type of display mode that is size, and a second type of display mode that is any one display mode other than size, as display modes of symbols of the groups of VMs. The first type of display mode may be dependent on total resource consumption of the VM group. The second type of display mode may be dependent on usage grade (an example of appropriateness of resource usage rate) of the VM group. Thus, an indication of total resource consumption of the VM group can be easily comprehended from the first type of display mode (size) of the symbol of the VM group, and the usage grade of the VM group can be easily comprehended from the second type of display format of the symbol.

In a management GUI such as the overview GUI 7500 and the detailed GUI 8500, the resource consumption may be the resource consumption of calculation resources of the resource type of interest. The reclamation program 2450 may also be provided. The reclamation program 2450 may decide, regarding each of at least a part of VMs, whether or not the VM is a candidate for an idle VM (a VM that is deemed to be unused), on the basis of the resource usage rate of each of a plurality of types of calculation resources. The visualization program 2470 may perform a highlighted display of VMs that have been determined to be candidates for idle VMs. The types of the plurality of resources for VMs (e.g., memory, CPU, and disk) are each independent. Accordingly, there can be situations where even a VM that has an appropriate resource usage rate regarding the resource type of interest becomes a candidate for an idle VM due to the resource usage rate of other types of resources being relatively low. The reclamation program 2450 finds candidates for idle VMs on the basis of resource usage rate with regard to resource types other than the resource type of interest as well, and the visualization program 2470 performs highlighted display of VMs found to be candidates for idle VMs regarding resource types other than the resource type of interest, on the GUI regarding the resource type of interest. Accordingly, the user can recognize that there are VMs taken to be candidates for idle VMs regarding resource types other than the resource types of interest (e.g., that there are VMs that have an appropriate resource usage rate for the resource type of interest, but are displayed highlighted in the GUI), even while viewing a GUI for the resource type of interest. Note that the resource type of interest may be a type of calculation resources regarding which the resource usage rate of any one VM group or any one VM out of at least part of VM groups has satisfied predetermined conditions. If there is such a resource type, considering optimization of this resource type with priority is preferable in general, but even if this resource type is given priority, any candidates for idle VMs for other resource types can be comprehended as well.

The visualization program 2470 may display the detailed GUI 8500 displaying both the cost and resource consumption of each of at least a part of a plurality of VMs as a management GUI, without going through the overview GUI 7500.

With regard to each of a plurality of VMs, attributes of the VM may include, out of the application that the VM belongs to, organization that manages the application, region to which the VM belongs, and the operating system (OS) of the VM, at least the application. With regard to each of a plurality of VM groups, the VM group may be configured of VMs of which at least the application is the same in the attributes of the VMs. Accordingly, optimization of resources and cost can be supported from at least the perspective of applications.

Although an embodiment of the present invention has been described above, this is an exemplification for describing the present invention, and is not intended to limit the scope of the present invention to the above configuration. The present invention can be carried out in various other embodiments.

What is claimed is:
1. An optimization support system that supports optimization of usage efficiency of resources, the optimization support system comprising:
 a data processing unit that identifies, for each of a plurality of virtual machines, resource consumption and cost of each virtual machine, from management data including data representing
  attributes and cost of the virtual machine, and
  at least resource consumption out of resource consumption and resource usage rate of each of a plurality of types of calculation resources allocated to the virtual machine; and
 a visualization unit that displays a management user interface (UI) that is a UI representing both resource consumption and cost regarding the plurality of virtual machines;
 wherein
  resource consumption in the management UI is resource consumption of calculation resources of the object type out of the plurality of types of calculation resources, the optimization support system further comprising:
  a reclamation unit that decides, regarding each of the at least part of virtual machines, whether or not the virtual machine is a candidate for an idle virtual machine, on the basis of each resource usage rate of the plurality of types of calculation resources, an idle virtual machine is a virtual machine deemed to be unused, and the visualization unit performs a highlighted display of a virtual machine determined to be a candidate for an idle virtual machine.

2. The optimization support system according to claim 1, wherein the data processing unit calculates total resource consumption and total cost for each of a plurality of virtual machine groups, on the basis of the management data, and the visualization unit displays an overview UI that is a UI representing both total resource consumption and total cost regarding each of at least part of virtual machine groups in a plurality of virtual machine groups, as the management UI.

3. The optimization support system according to claim 2, wherein the overview UI has a first coordinate plane that has a first axis corresponding to resource usage rate of calculation resources of an object type out of the plurality of types of calculation resources, and a second axis orthogonal to the first axis, one of the total resource consumption and total cost corresponds to the second axis, and with regard to each of at least part of virtual machine groups, a symbol of the virtual machine group is plotted on the first coordinate plane, and a display mode of the symbol of the virtual machine group is dependent on the other of the total resource consumption and total cost of the virtual machine group.

4. The optimization support system according to claim 3, wherein the virtualization unit displays a detailed UI that is a UI representing, with regard to each of at least part of virtual machines belonging to one or more virtual machine groups out of virtual machine groups represented on the first coordinate plane, both cost and resource consumption of calculation resources of the object type regarding the virtual machine, as the management UI.

5. The optimization support system according to claim 4, wherein the detailed UI has a second coordinate plane having a third axis corresponding to a scale of a virtual machine and a fourth axis orthogonal to the third axis, one of cost and the resource consumption of calculation resources of the object type corresponds to the fourth axis, and with regard to each of the at least part of virtual machines, a symbol of the virtual machine is plotted on the second coordinate plane, there is a first type of display mode that is size, as a display mode of the symbol of the virtual machine, and the first type of display mode of the symbol of the virtual machine is dependent on the other of the cost of the virtual machine and resource consumption of the virtual machine regarding calculation resources of the object type.

6. The optimization support system according to claim 5, wherein, with regard to each of the at least part of virtual machines, there is a second type of display mode that is any one display mode other than size, as the display mode of the symbol of the virtual machine, and the second type of display mode of the symbol of the virtual machine is dependent on appropriateness of resource usage rate of the virtual machine.

7. The optimization support system according to claim 5, wherein the second coordinate plane has a band extending from the third axis parallel to the fourth axis, for each scale of virtual machine, an appropriate range of resource consumption regarding calculation resources of the object type differ depending on the scale of the virtual machine, and the display mode of each part of the band corresponding to the scale is dependent on appropriateness of resource consumption corresponding to the part regarding calculation resources of the object type, for each scale of virtual machine.

8. The optimization support system according to claim 3, wherein, with regard to each of the at least part of virtual machine groups, there is a first type of display mode that is size, and a second type of display mode that is any one display mode other than size, as a display mode of the symbol of the virtual machine group, the first type of display mode is dependent on total resource consumption of the virtual machine group, and the second type of display mode is dependent on appropriateness of the resource usage rate of the virtual machine group.

9. The optimization support system according to claim 2, wherein, with regard to each of the plurality of virtual machines, attributes of the virtual machine include, out of an application that the virtual machine belongs to, an organization that manages the application, a region to which the virtual machine belongs, and the operating system (OS) of the virtual machine, at least the application, and wherein, with regard to each of the plurality of virtual machine groups, the virtual machine group is configured of virtual machines where at least the application out of attributes of the virtual machines is the same.

10. The optimization support system according to claim 1, wherein the object type is a type of calculation resources regarding which resource usage rate of any one virtual machine group or any one virtual machine out of the at least part of virtual machine groups satisfies predetermined conditions.

11. The optimization support system according to claim 1, wherein the visualization unit displays a detailed UI that is a UI representing, with regard to each of at least part of the plurality of virtual machines, both cost and resource consumption of the virtual machine, as the management UI.

12. The optimization support system according to claim 11, wherein the detailed UI has a second coordinate plane having a third axis corresponding to a scale of a virtual machine and a fourth axis orthogonal to the third axis, one of cost and resource consumption of calculation resources of the object type corresponds to the fourth axis, and, with regard to each of the at least part of virtual machines, a symbol of the virtual machine is plotted on the second coordinate plane, there is a first type of display mode that is size, as a display mode of the symbol of the virtual machine, and the first type of display mode of the symbol of the virtual machine is dependent on the other of the cost of the virtual machine and resource consumption of the virtual machine regarding calculation resources of the object type.

13. An optimization support method of supporting optimization of usage efficiency of resources, the method comprising:

identifying, for each of a plurality of virtual machines, resource consumption and cost of each virtual machine, from management data including data representing attributes and cost of the virtual machine, and resource consumption of each of a plurality of types of calculation resources allocated to the virtual machine; and displaying a management UI that is a UI representing both resource consumption and cost regarding the plurality of virtual machines;

wherein resource consumption in the management UI is resource consumption of calculation resources of the object type out of the plurality of types of calculation resources, the optimization support method further comprising:

deciding, regarding each of the at least part of virtual machines, whether or not the virtual machine is a candidate for an idle virtual machine, on the basis of each resource usage rate of the plurality of types of calculation resources, an idle virtual machine is a virtual machine deemed to be unused, and performing a highlighted display of a virtual machine determined to be a candidate for an idle virtual machine.

14. A non-transitory computer readable medium, storing instructions causing a computer to execute an optimization support method of supporting optimization of usage efficiency of resources, the method including identifying, for each of a plurality of virtual machines, resource consumption and cost of each virtual machine, from management data including data representing attributes and cost of the virtual machine, and resource consumption of each of a plurality of types of calculation resources allocated to the virtual machine, and displaying a management UI that is a UI representing both resource consumption and cost regarding the plurality of virtual machines;

wherein resource consumption in the management UI is resource consumption of calculation resources of the object type out of the plurality of types of calculation resources, the method further including:

deciding, regarding each of the at least part of virtual machines, whether or not the virtual machine is a candidate for an idle virtual machine, on the basis of each resource usage rate of the plurality of types of calculation resources, an idle virtual machine is a virtual machine deemed to be unused, and performing a highlighted display of a virtual machine determined to be a candidate for an idle virtual machine.

* * * * *